United States Patent [19]

Hilley et al.

[11] 4,075,605
[45] Feb. 21, 1978

[54] CHARACTER RECOGNITION UNIT

[75] Inventors: Larry L. Hilley, Garland; Marion W. Neff, Arlington, both of Tex.

[73] Assignee: Recognition Equipment Incorporated, Dallas, Tex.

[21] Appl. No.: 505,931

[22] Filed: Sept. 13, 1974

[51] Int. Cl.² .............................................. G06K 9/12
[52] U.S. Cl. ................ 340/146.3 AC; 340/146.3 MA
[58] Field of Search .............. 340/146.3 AC, 146.3 Y, 340/146.3 MA, 146.3 SY, 146.3 R

[56] References Cited

U.S. PATENT DOCUMENTS

| | | | |
|---|---|---|---|
| 3,140,466 | 7/1964 | Greanias et al. | 340/146.3 AC |
| 3,573,730 | 4/1971 | Andrews et al. | 340/146.3 MA |
| 3,585,592 | 6/1971 | Kiji et al. | 340/146.3 AC |
| 3,618,016 | 11/1971 | Van Steenis | 340/146.3 Y |
| 3,755,780 | 8/1973 | Sammon et al. | 340/146.3 AC |
| 3,832,683 | 8/1974 | Nadler et al. | 340/146.3 AC |
| 3,868,635 | 2/1975 | Shah et al. | 340/146.3 Y |
| 3,873,972 | 3/1975 | Levine | 340/146.3 AC |
| 3,909,785 | 9/1975 | Howells | 340/146.3 SY |
| 3,930,229 | 12/1975 | Crane et al. | 340/146.3 SY |

OTHER PUBLICATIONS

McMains et al., *IBM Tech. Disclosure Bulletin*, "Character Recognition Technique", vol. 15, No. 1, June 1972, pp. 15–17.

*Primary Examiner*—Leo H. Boudreau
*Attorney, Agent, or Firm*—John E. Vandigriff; Thomas W. DeMond

[57] ABSTRACT

A method and system for automatic optical character recognition wherein a continuous flow of image data is processed at a scan rate high compared to the relative movement of the information-containing field across a sensor array. A two-dimensional array of photosensors is self-scanned to provide a continuous flow of binary character segment and void zone representations which are decoded by reference to a ROM to produce multibit feature codes characterizing unique relationships between line segments. For each row or column scanned, a representative feature code is produced with a sequence of such codes representing a complete scan of the sensor array. Successive sequences of feature codes are applied to a decision network having a multiplicity of nodes where each node is accessible to every other node by one state change to produce a representative output character code. The multiple character codes which may be produced during the movement of a single character across the sensor array is then processed by a decision circuit which generates a final character recognition signal.

12 Claims, 7 Drawing Figures

CHARACTER RECOGNITION UNIT

FIELD OF THE INVENTION

This invention relates to automatic machine operations for recognition or identification of patterns, and more particularly to utilization of a continuous stream of binary signals representing character and void zones of an information-containing field. In one specific aspect, the invention is directed to sequential decision logic processing of data from a self-scanned two-dimensional photosensor array to identify a character from unique relationships between sequences of feature conditions produced upon repetitive scanning of the two-dimensional array.

DESCRIPTION OF THE PRIOR ART

Automatic character recognition machines presently known are either optical character recognition (OCR) devices, magnetic ink character recognition (MICR) devices, or a combination of the two.

A problem common to each is low reliability at read rates demanded in industrial operations. Further, there are certain specific types of character defects or character environment defects, such as a border print, which cause existing optical readers to fail to identify a character. Similar problems plague MICR systems.

Prior OCR techniques have included repeated capture of an X-Y matrix of signals representing a character field and comparing the same with a set of masks to aid in selection of a result. Stroke analysis and feature analysis techniques have also been employed.

Improved reliability of character recognition at read rates currently required is provided by the present invention, which employs a recognition system in which a continuous flow of data at a row scan rate of the photosensor array is subjected to a sequential decision technique to arrive at the identity of a character present within an information field. Scan rates very high compared to the relative movement between the array and the information field cause a character to be scanned repeatedly as its image moves across a photosensor array. Thus, a single character will be scanned a number of times, with the final decision being the character identified more than any other character.

SUMMARY OF THE INVENTION

The present invention comprises an optical character reader having a two-dimensional array of photosensors operated continuously to supply a stream of binary data at the row scan rate. The recognition system employs a sequential decision to identify the character represented by binary data.

More particularly, an array of photosensors is scanned automatically in an ordered sequence, such as from top to bottom one row at a time, to produce a continuous stream of binary data representing black character segments and white voids. The scan rate is high compared to the relative movement between the field of information and the read head to allow multiple scans of a character whose image passes across the array. A binary word produced for each scan of each row is decoded by a memory feature generator to produce a corresponding feature code representing the unique relationship of line segments within the row. Sequential decision logic, employing a memory in which character codes are stored, receives a continuous stream of feature codes corresponding to a scan of the entire array. As the array is scanned from top to bottom, the sequence of the codes as well as the individual feature codes are employed in character recognition.

Data from a given character will be repeatedly processed while the character image passes across the field viewed by a photosensor array. Character codes generated during each frame comprising one complete scan of the photosensor array are stored. When the character image has passed from the field of view, a final character identification is made on the basis of the character identification generated the greatest number of times.

In one aspect of the invention, sequential decision logic is controlled by a stream of data flowing at the row scan rate without intermediate storage to identify a character within the information field.

In a further aspect, a character presence logic circuit is employed to discern whether a character or a space between adjacent characters is in registration with the center portion of the photosensor array.

In a still further aspect, criteria easily tailored to a particular print font are applied to the video data and compared with the generated character identification to enhance the reliability of the recognition unit.

In another apsect of the invention, quadrant tracking is employed to protect against character fragmentation which may result from scanning between information lines.

In still another aspect, a space is generated after a sequence of character identifications which form a word, phrase, or sentence.

In a still further aspect, a scan direction logic circuit senses the direction of sweep of the photosensor array across the field of information to be read.

DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

Figure 1:
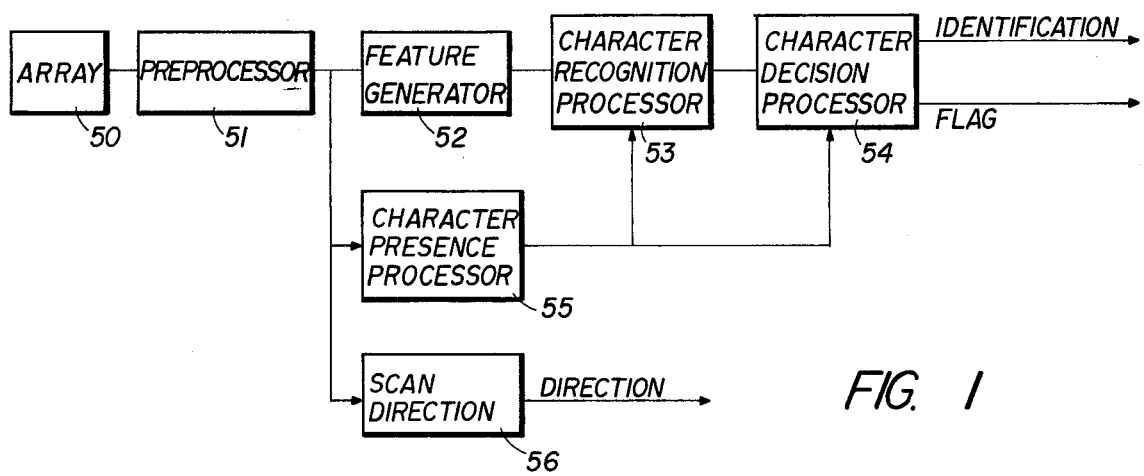
FIG. 1 is a block diagram illustrating the relationship of a self-scanned photodiode array to one embodiment of the recognition system as employed herein.

In accordance with the present invention automatic character recognition employs elements of an array of photosensors, scanned preferably a row at a time, to produce a continuous flow of binary data. The array is scanned at a rate very high compared to the rate of relative movement between the array and a document upon which the symbols to be read appear. Thus, the entire array is scanned many times in a raster-like sequence while in registration with any given character. The output of the array is a sequence of zero level and one level pulses depending on whether the field viewed at a given sweep is white or black.

In accordance with the embodiment here to be described, a 12 by 38 photosensor array is scanned from top to bottom a row at a time, scanning from left to right. Thus, on the scan of each row, a 12 bit word is output, from which there is produced a four bit code representative of a given feature characterizing that row at the time of the scan. In accordance with the example here described 16 features are encoded as follows:

TABLE I

Feature Codes

0 = all white
1 = long line - 7 or more black cells
2 = medium line in left third of array
3 = medium line in center of array
4 = medium line in right third of array
5 = vertical line segment in left third of array
6 = vertical line segment between sensors 5 & 7
7 = vertical line segment in center of array
8 = vertical line segment between sensors 7 & 9
9 = vertical line segment in right third of array
10 = wide pair of line segments
11 = narrow pair in left third of array
12 = narrow pair in center of array
13 = narrow pair in right third of array
14 = indecision between code 1 and code 15
15 = triple line segments Thus, the 16 features are to be represented by a multibit code which is then employed in a logic system wherein the features encountered during each given scan are sequentially applied at the row scan rate to a recognition unit which interprets the codes and the sequence thereof to produce an output code representative of a given character.

The output from the recognition unit is then applied to a decision circuit which produces a single output identifying a given character from a flow of character codes generated by the recognition unit at the frame rate while a single character is in registration with the photosensor array.

FIG. 1

With the foregoing understanding, reference may be had to FIG. 1 wherein a photosensor array 50 is connected through a preprocessor 51 to a feature code generator 52, a character presence processor 55, and a scan direction unit 56. Unit 51 includes an amplifier with automatic gain control and an A/D converter. The output of the feature code generator leads to a character recognition processor 53 whose output in turn is applied to a character decision processor 54. The output of processor 55 is applied to both processor 53 and processor 54. The outputs of the scan direction unit 56 and processor 54 are connected to an edit unit (not shown) which is activated by a decision complete flag from processor 54. The edit unit receives character identification and scan direction signals to produce a symbol, phrase or sentence as an output.

FIG. 2

Figure 2A:
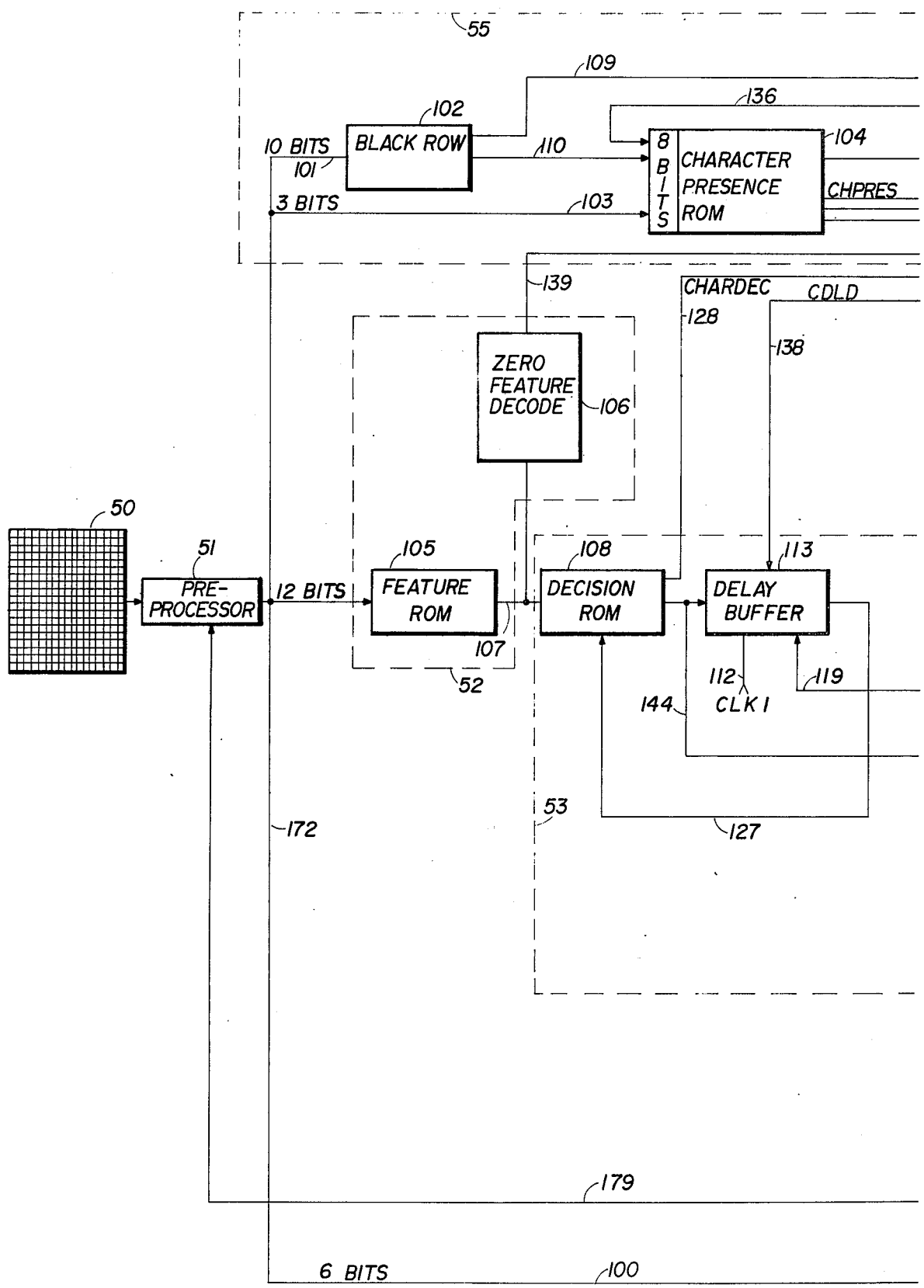
FIGS. 2A and 2B form a more detailed block diagram of the embodiment illustrated in FIG. 1.
Figure 2B:
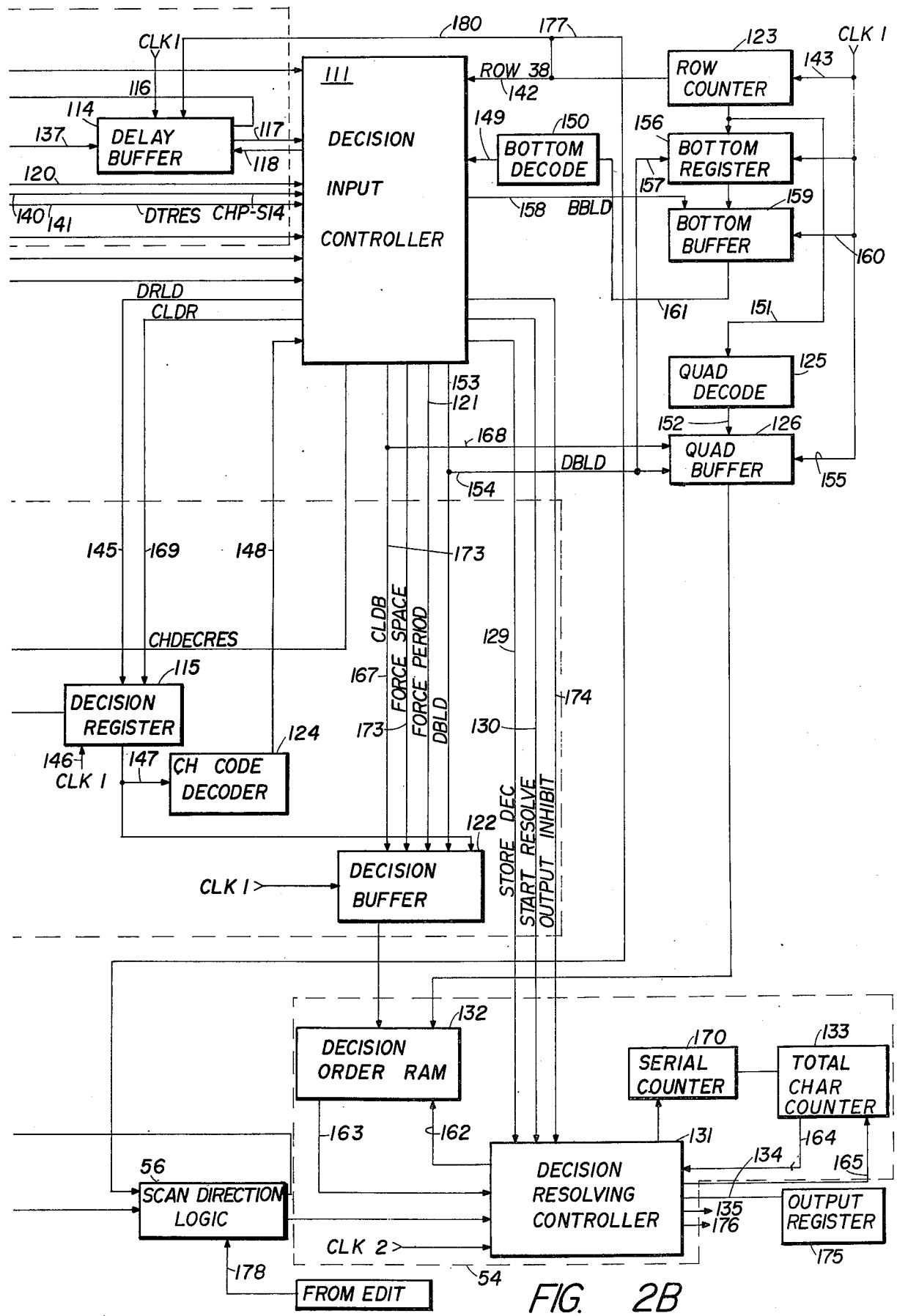

FIG. 2 is a more detailed block diagram of the system illustrated in FIG. 1. As in FIG. 1, the photosensor array 50 is connected by way of preprocessor 51 to the input of a feature generator 52. Photosensor array 50 is a self-scanned photosensor array which may be of the photodiode type manufactured and sold by Redicon Corporation of Mountain View, California. Use of a 12 by 38 cell array will here be described.

Preprocessor 51 employs a binary video input representing the black/white nature of the output from each sensor in a row of array 50, to produce a twelve bit binary pulse train.

The left-hand six bits of the 12 bit output is applied by way of line 100 to a scan direction unit 56. The center 10 bits of the 12 bit output are applied by way of line 101 to a black row decode unit 102, while the three center row bits of the 12 bit output are applied by way of line 103 to a 256 by 8 bit character presence ROM 104. Both the decode unit 102 and the ROM 104 are component parts of the character presence processor generally indicated by the processor 55.

All 12 bits of the output word are also transmitted to a 4096 by 4 bit ROM 105. Each of the selected combinations of the bits from the 12 bit correlator are represented by four bit codes stored in ROM 105.

ROM 105 thus accepts data a row at a time from preprocessor 51, each row comprising a 12 bit binary word, and derives one of the 16 feature codes shown in Table I from each of the 12 bit inputs. The resulting feature codes are applied to a character recognition processor 53 generally indicated by dotted outline to produce a character recognition signal.

It is to be understood that the invention is not limited to the 12 bit wide video or to the 16 feature code hardware limitations associated with the particular embodiment described. The video can be wide or more narrow, and the number of features can be more or less.

Output feature codes stored in ROM 105 appear sequentially on a bus 107 connected to decoder 106 and to a second ROM 108 of character recognition processor 53. On receiving a load signal, CDLD, on line 138 from a decision input controller 111, processor 53 is activated. Such load signal is first generated in response to a signal from processor 55, which locates a character vertically by sensing a row of video data which does not have any black information in the row, followed by a row having at least one black cell.

Decision ROM 108, a 2560 by 8 bit ROM, includes a sequential decision network consisting of a large number of logical nodes or states, each node having the possibility of access to every other node by one state transfer. While ROM 108 is shown as a unitary structure, it comprises a group of ROMs of sufficient number to form a sequential decision network. The network is of the type that has a plurality of logic nodes with paths interconnecting the nodes. A particular path taken at any given time depends upon the sequence of the feature codes that have preceded the instant under consideration and the particular feature code then appearing.

In the embodiment here described, ROM 108 includes 160 nodes or states of 16 words per node, eight bits per word. From each node in the embodiment, there is a possibility of 16 paths or links to a next node. These links may be 16 links to 16 different nodes or 16 links to one other node, or any combination thereof.

Tables III A–D, ordered as shown in Table II, comprise a sequential decision network representation wherein a network of logical nodes or states are interconnected by means of links or logical paths. All logical states are designated by four numeric characters, all links are designated by a feature code numeric, and a decision is designated by a feature code numeric followed by a space and a symbol or character on the same horizontal line. The characters or symbols reflected in the tables correspond to an OCR-A type font comprising numerals 0-9, characters N, D, M, A, U, P, X and Y, and symbols $, ", /, . and >.

Referring to Tables III A-D, it is seen that all processing begins with state 0000. A state controller comprising a twelve bit input decoder (not shown) is contained in ROM 108. The controller establishes the state transfers from present state information retained in buffer 113 and from the incoming feature code. If no link to another state is indicated by the immediate feature code, the state controller continues the process from state 0000. Then, as shown in Table III A, the presence of feature code 1 causes the process to transfer through link 1 to state 0101. Alternatively, the process may proceed through link 2 from state 0000 as well as links 3 through 14. From state 101, depending upon the next feature code encountered, the process may continue along links 5, 6 through 10, or 12 through 15.

TABLE III A

```
0000  1  0101  5  0207  1  0501  0    •
                          8  0602  1  1000  0          5
                                          6  1001  0        $
                                                    6        $
                                                    7        $
                                                    8   .    $
                                       7  1001
                                 3  1000
                             9  0602
                            10  0602
                            12  0602
                   2  0501
                   3  0501
                   5  0305  0    •
                            1  0501
                            3  0502  8  0607  1  0705  0          5
                                                    6  1000
                                                    7  0809  0        5
                                                            7  1000
                                          8  0702  1        5
                                                    3  1000
                                                    7  0803  0        5
                                                            1        5
                                                            3        5
                                                           14        5
                                                    8  0803
                                                    9  0803
                                       9  0702
                                 9  0607
                   5  0402  0            •
                            1  0502
                            3  0502
                            8  0607
                            9  0607
                           12  0502
                           13  0502
                           15  0502
                   6  0402
         6  0305
         7  0308  1  0502
                   3  0502
                   9  0607
                  12  0406  1  0502
                            3  0502
                            9  0607
                           12  0507  1  0514  0              1
                                          10  1003  0              1
                                       3  1
                                       9  0704  1              1
                                                9  0702
                                               12  0507
                                               13  0507
                                       14  0514
                            13  0507
                   13  0406
              10  0410  0        -
                        1  0700  0
                                 3  0800  0          0
                                          5  0900  5        P
                                                    6        P
                                          6  0900
                                          8  0801  0          0
                                                    8  0901  0            0
                                                            7  1002  0            9
                                                            8  1002
                                                            9  1002
                                                    9  0901
                                 9  0801
                                 5  0800
                                 6  0800
                                 8  0801
                                 9  0801
                   8  0408  0        -
                            1  0700
```

TABLE III A—Continued

```
                                        8  0306  1  0503  5  0609  5  0703  1         2
                                                                        2         2
                                                                        3         2
                                                          6  0703
                                                   6  0609
                                                   8  0608  8  0701  1         3
                                                                       14         3
                                                   9  0701
                                           0308
                                        8  0403  1  0503
                                                 3  0509  1  0503
                                                          5  0609
                                                          6  0609
                                                          7  0313  0         7
                                                          8  0508  1         3
                                                                   5  0609
                                                                  13  0406
                                                   9  0508
                                                   5  0609
                                                   6  0214  0         7
                                                            1  0503
                                                   7  0214
                                                  12  0509
                                                  13  0509
                                           9  0403
                              9  0408
                             10  0500  0     -
                                       1  0700
                                      10  0600  0     -
                                                 1  0700
                                                14  0700
                                      12  0600
                                      14  0700
                             14  0700
  6  0207
  7  0212  0     -
           6  0402
           7  0308
  8  0208  1  0700
           8  0306
           9  0306
          10  0410
  9  0208
 10  0303  5  0207
           6  0207
           8  0208
           9  0208
          10  0410
```

TABLE III B

```
              12  0401  0     -
              12  0506  0     -
 12  0204  5  0207
           6  0207
           7  0212
           8  0208
           9  0208
          10  0410
          12  0307  0     -
                   1  0405  0     D
                           10  0715  0     D
                                     1     8
                                    10  0610  1     8
                                             3     8
                                            14     8
                                            15     8
                           12  0715
                    3  0405
                    6  0809
                   10  0404  0     -
                             1  0405
                             2  0405
                             3  0405
                            10  0505  0     -
                                      1  0405
                                      2  0405
                                      3  0405
                                     10  0604  0     -
                                               1     8
                                               3     8
                                              12  0913  1     8
                                                       12  0603  1     D
                                                                 2     D
                                                                 3     D
                                              13  0913
                                              14         8
```

TABLE III B—Continued

```
                              12  0404
                              13  0404
                   13  0307
          13  0204
          14  0205    5  0207
                      6  0207
                      8  0208
                      9  0208
                     10  0303
                     12  0204
                     15  0814  10  0911   0         N
          15  0205
2  0102   0             •
          1  0101
          7  0212
         11  0204
         12  0209    3  0405
                     6  0100   0           •
                                1  0101
                                4  1015
                                5  0207
                                6  0203   0           •
                                           1  0502
                                           3  0502
                                           5  0402
                                           6  0305
                                           8  0607
                                          13  0406
                                7  0114   0           •
                                           6  0402
                                           7  0115   0          •
                                                     3  0502
                                                    12  0406
                                                    13  0406
                                         12  0209
                                8  0302   0           •
                                           9  0510   2  0615  0         >
                                                     5  0615
                                                     6            >
                                                     7  0611  0         •
                                                               5         >
                                                               6         >
                                                              12  0406
                                                              13  0406
                    11  0204
                    12  0209
                    13  0209
           7  0212
           8  0306
           9  0208
          10  0303
          12  0307
          13  0307
3  0103    1  0101
           3  0100
           4  0104   1  0101
                     7  0212
                    13  0209
           6  0203
           7  0114
           8  0302
           9  0208
          11  0204
          12  0209
          13  0209
4  0104
5  0105    1  0101
           2  0310   1  0101
                     3  0411   7  0308
                                8  0510
                               12  0209
                     6  0411
                     7  0411
                     8  0510
                    11  0204
                    12  0209
           3  0310
           5  0311   1  0101
                     2  0510
                     3  0510
                     5  0412   3  0807   0           •
                                          5  0501
                                          6  0501
                                          8  0510
                                          9  0510
                                         12  0710   7  0904   0          4
                                                               3  1009  10  1007  10        X
                                                                                  12        X
```

TABLE III C

```
                                              13              X
                                      12    1007
                              12    1009
                       8    0904
                       9    0904
                       12   0804    1   0810    0              6
                                        10   0601    0         6
                                                 10   0902  0     A
     5   0312    0           *
          3   0807
          5   0315    0           *
                       1    0511   10   0706    1   0810
                                             14   0810
                                             15            6
                              12   0706
                              14   0706
                       2    0511
                       3    0511
                       12   0413    1   0511
                                 12   0512    1   0513    0            1
                                                  10   0612   0         1
                                                        10   0902
                              13   0512
                              14   0511
                       14   0511
              6    0315
              7    0611
              8    0510
              12   0710
     6    0312
     7    0312
     8    0510
     10   0708   10   0802    1   0205
                    10   0910    1   0213    0         U
                                 7   0905   6   1006   0            Y
                                                3   1009
                                                12   1007
                                        7   1006
                           10P PP K
                           15   0908   10   0911
                                 15   0914   10   0911
                                         15   0605    0         U
                                             1   0817  10  1012   0       N
                                                                11              N
                                             15   0711  10  1012
                                                        11   1012
                                                10   0911
                                                14   0812
                                                15   0812
                        7   0905
                        10   0713    1   0211    3   0213
                                             6   0606   0         U
                                                 7   0904
                                                 8   0904
                                                 9   0904
                                         7   0604
                                         8   0606
                                         9   0606
                                         15   0605
                              2   1014    0         U
                                         6   0606
                                         7   0606
                                         8   0606
                                         9   0606
                                         15   0605
                        7   0905
                        10   0201    1   1014
                                     7   1014
                                     7   0905
                                     15   1014
                        12   0201
                        13   0201
                        15   1014
                12   1004   6   0905
                            7   0905
                            8   0606
                            10   1010    1   1008   7   0904
                                                    8   0904
                                                    9   0904
                                                    10   0811   1         8
                                                                 8         4
                                                                 9         4
                                                    15   0908
                            12   1005    1   1008
                                         6   0905
                                         7   0905
                                         8   0905
                                     15   0914
                            15   0915   10   0911
                                        11   0911
                                        15   0908
             12   0910
```

TABLE III C-Continued

```
            13  0810
            15  0912   1  0205
                       7  1006
                      10  0713
                      15  0908
        12  0802
        13  0912
        15  0912
12 0614  1  0400  0
                  5  0709   1  0815   8  0907   1  1001
                                                3  1001
                                               14  1001
                                      9  0907
                                     10  0907
                                     13  0907
                              2  0815
                              3  0815
                              8  0907
                             12  0815
                             14  0815
                  6  0709
                 10  0709
                 12  0504   5  0709
                            6  0709
                           12  0710
        10  0707  1  0805   7  0904
                            8  0904
                            9  0904
                           12  0710
                  8  0904
        12  0707
        13  0707
13 0614
```

TABLE III D

```
                        13  0614
                6  0412
               10  0708
               12  0614
         6  0200  1  0101
                  3  0807
                  5  0412
                  6  0412
                  7  0312
                 10  0708
                 12  0714  1  0101
                          10  0806  1  0903   8  0904
                                             11  0205
                                             12  0205
                                             14  0205
                                             15  0205
                                    3  0903
                                   10  0910
                                   12  0314   1  1008
                                              3  1008
                                              6  1010
                                              7  0904
                                             14  1008
                                             15  0908
                                   15  0912
                          11  0806
                          12  0806
         10  0708
         11  0714
         12  0714
   6  0106  1  0101
             2  0102
             3  0103
             5  0311
             6  0909  1  0101
                      3  0103
                      5  0412
                      6  0412
                      7  0412
                      8  0510
                     10  0708
                     12  0210  1  0101
                              10  0806
                              12  0806
                              15  0912
            13  0614
       7  0909
      10  0708
      12  0210
      13  0912
  7  0107  1  0101
            2  0102
            3  0103
            4  0104
            6  0215  1  0101
                     3  0103
                     6  0412
                     7  0300  1  0400
                              3  0400
                              6  0409  0           /
```

TABLE III D—Continued

```
                                        6   0712  0            /
                                                 12  0710
                                            12  0710   .
                                    7  0515  0      .
                                            1  0807
                                            3  1011  2  0906  0      .
                                                             5  0615
                                            12  0413
                                        6   0409
                                        9          >
                                        12  0413
                                        13  0413
                                8  0515
                                12  0407  1  0807
                                          12  0307
                                13  0614
                        8   0300
                        10  0708
                        11  0300
9                       12  0300
                        13  0614
                7   0215
                8   0215
                13  0614
        8  0108  1   0101
                 3   0103
                 7   0215
                 8   0206  7   0301  0           /
                                    6   0409
                            8   0808  0       .
                                    1   1015
                                    7   0301
                                    12  0710
                        12  0614
                10  0110  1   0101
                         10  0802
                         11  0806
                         12  0806
                         13  0202  1   0101
                                   3   0103
                                   10  0806
                                   12  0806
                                   13  0912
                                   15  0912
                        15  0915
        9   0109  1   0101
                 8   0808
                 9   0813  8  0808
                          9  0808
                 10  0708
        10  0110
        11  0111  1   0101
        12  0112  1   0101
                 2   0102
                 3   0103
                 10  0806
                 12  0202
        13  0113  1   0101
                 3   0103
                 10  0202
                 12  0202
                 13  0202
        14  0101
```

Assuming that the state controller directs the process through link 5, the decision flow will continue from state 101 to state 0207. At state 0207 another feature code enters and is processed by the state controller which may direct the decision flow along links 1 through 3, links 5 through 7, or link 10. With the process continuing through link 1, the flow will transfer from state 0207 to state 0501. Again at this juncture another feature code is received from ROM 105, which directs the decision flow along link 0, links 8 through 10, or link 12. If link 0 is chosen as the next decision path, a character decision is made. That decision being the symbol ".". If link 8 is selected as the decision path, then the decision flow will continue from state 0501 through link 8 to state 0602.

Note that if links 9, 10 or 12 were chosen, the blank space immediately after the designation of state 0602 indicates that the state transfer path required is used in another identification path, and that the state information has already been printed out. Thus, the tables are searched vertically upward for a state 0602 printout with state information. Such a printout is found at link 8, where it is seen that either of two possible paths lead from state 0602 to state 1000. It is to be understood that in the ROM implementation illustrated in FIG. 2, the upward search is performed in a single state transfer.

If link 1 is chosen as the next logical path from state 0602, then the decision flow will continue through link 1 from state 0602 to state 1000. On the entry of the next feature code, the state controller may direct a decision flow along link 0, link 6, or link 7. If link 0 is chosen, then a character decision is made, that character being "5". If either link 6 or link 7 is the chosen path, then the decision flow is through link 6 or link 7 from state 1000 to state 1001. Here it is seen that no matter the link chosen, whether such link is link 0 or links 6 through 8, the same decision, symbol "$", results.

FIG. 3

Figure 3:
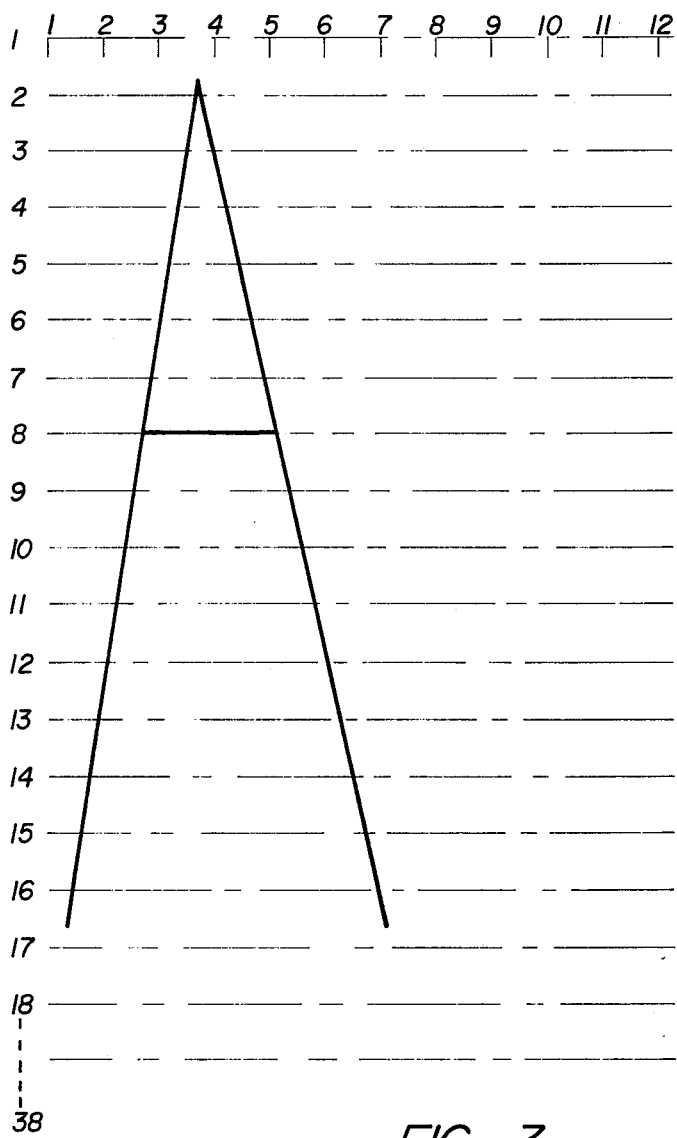
FIG. 3 illustrates an alphanumeric character in registration with the elements of a self-scanned photodiode array.

As a further example, consider along with the character codes shown in Table I the particular embodiment illustrated in FIG. 3, where the character "A" is in registration with a 12 by 38 element array of photosensors. A row by row scan produces the following sequence of feature codes: 0, 5, 5, 5, 3, 12, 12, 1, 10, 10. Such a sequence of feature codes causes the ROM 108 to direct the following state transfers: 0105, 0311, 0412, 0807, 0710, 0804, 0810, 0601, 0902. Upon receipt of a feature code 0 at state 0902, it is seen that a decision is made and the character identified is the character "A". Since the sequence of feature codes designated result from a top to bottom and row by row scan, the scanner first sees a vertical line segment in the left third of the array during the first three scans of the character, followed by a medium line in the center, a narrow pair of lines in the center, a long line representation of the cross bar of the letter "A", and finally a wide pair of lines as designated by a feature code 10 followed by a feature code 0. As the letter "A" moves across the array, the feature code designated by the numeral "5" changes sequentially to "6", "7", "8", and ultimately to "9". Further changes in position, feature relationships or magnification generate a different feature sequence which is processed in the decision network by adding new links between logical nodes to produce a correct decision.

If noise features cause the decision flow to continue along an erroneous path from which the state controller is unable to designate an available link from incoming feature codes, then the decision process holds for another feature code or transfers to other nodes in which the character segments already attained have characteristics which would lead along a path to the transferred state.

Where minimal differences remain between the feature information received and a character decision, a decision is made prior to receiving the additional features. Processor 53 thus appears to add links between nodes to derive a known character rather than signal a reject when the additional information is required.

TABLE IV

| Feature Code | State |
|---|---|
| 1 | 0101 |
| 1 | 0101 |
| 3 | 0101 |
| 9 | 0208 |
| 9 | 0306 |
| 9 | 0403 |
| 12 | 0509 |
| 1 | 0503 |
| 1 | 0503 |
| 9 | 0608 |
| 9 | 0701 |
| 9 | 0701 |
| 9 | 0701 |
| 1 | — |
| 1 | — |
| 0 | — |
| 0 | — |

Referring to the feature code sequence of Table IV, the above described additional properties of the sequential decision network may be illustrated by following the process in recognizing the numeral "3" from a sequence of feature codes including noise.

As shown in Table IV and Tables III A-D, a "1" code causes a transfer from state 0000 to state 0101. A succeeding "1" or "3" code, however, results in the decision process entering a hold state to await a feature code which will generate a transfer to available links 5 through 10, or links 12 through 15.

The three succeeding "9" codes generate transfers to states 0208, 0306, and 0403, respectively. Normally, another "9" code would follow. However, in the illustrated process, noise causes ROM 105 to generate a "12" code which in turn is decoded to create a transfer to state 0509.

Upon receiving the next feature code, "1", the decision process is transferred to state 0503. This transfer dramatically illustrates a paramount difference between the decision network herein described and the commonly known decision tree. A decision tree always flows downward along a connected path, while here there is illustrated a transfer to a state not within the traveled path. Further, the transfer state is at a higher level rather than a lower level. Thus, the present invention embodies a decision network which may alternately flow upward, downward, or between paths in a single state transfer.

Continuing with the process as illustrated in Table IV, a second "1" code merely causes the decision process to enter a hold state at state 0503, while a subsequent "9" code generates a transfer to 0608.

Upon receiving the next three "9" codes, the decision process transfers to state 0701 and holds. When a "1" code is received, a decision is made prior to receiving the two "0" codes designating the end of a character scan. Thus no material differences remain between the feature information received and the recognized numeral "3". If a material difference had remained or if alternative decisions were still possible when the first "1" code was received, then the decision process would have remained at state 0701 without making a decision until after additional feature information had been received.

It is thus apparent that the algorithm manifested by the sequential decision network in processor 53 comprises a distributed flow through interconnected logical nodes, such nodes being nonordered unlike the conventional tree network. In the commonly known decision tree, once a limb or upper level branch has been selected, a flow along that branch cannot be retraced. In other words, the decision flow in the tree is always downward. It is never across branches and it never reverts to a previous branch as does the algorithm of the present invention. To arrive at the present configuration, a single character decision tree was implemented and then subsequent characters were added by utilizing as many of the existing links as possible and adding only nonredundant decision paths. When the process was complete, redundancies had been eliminated, and an algorithm which was no longer comparable to the commonly known decision tree resulted.

Continuing with the description of the system as shown in FIG. 2, character recognition process 53 is seen to be a network including ROM 108, a decision delay buffer 113, a decision register 115, a character code decoder 124, and a decision buffer 122. In the normal decision flow, ROM 108 accepts four bit word inputs from ROM 105 at a flow rate equal to the row scan rate of array 50, examines the present state as represented by the contents of buffer 113, and commands a state transfer in the sequential decision network embodied in ROM 108.

Zero features from ROM 105 are not gated to command the generation of a state in buffer 113 until after two white row signals are detected by decision input controller 111, signifying the bottom of a character. If the white row at the bottom of a character is also bottom row 38 of array 50, then only one white row is required. At that point, zero features are processed to generate a decision as shown in Tables III A-D.

Prior to processor 53 being enabled, character presence processor 55 examines the input video data received from preprocessor 51 a row at a time to determine if a character is passing through the field of view.

The character is first located vertically by looking for row video having only void zones followed by row video containing black information. For each row of video data received from preprocessor 51 along line 101, a black row decoder 102 generates a signal designating either an all white row or a black cell row which is led by way of lines 109 and 110 to decision input controller 111, and to a 256 by 8 bit character presence ROM 104, respectively.

When decision input controller 111 receives a white row signal followed by a black row signal, character recognition processor 53 is enabled by means of a signal, CDLD, along line 138 to buffer 113. Data from ROM 108 is then clocked into buffer 113 at the row scan rate by a clock source, CLK1, generating load signals along line 112.

During the period processor 53 is enabled, a tracer circuit comprising ROM 104, a character presence delay buffer 114 and feedback loop 136 receives three bits of video data at the row scan rate on line 103, and looks for black video which blocks the path of the center three columns of a top to bottom scan.

If the path is not blocked, then the indication is that a space between adjacent characters rather than a character is in registration with the center three columns of array 50.

FIG. 4

ROM 104 is programmed to respond to data on lines 103, 110, and loop 136. An eight bit input decoder (not shown) selects the four bit words stored in the ROM to be output as a sequence of generated states on line 137. The data on line 137 is clocked into buffer 114 by a clock source, CLK1, generating a signal at the row scan rate on line 116.

Figure 4:
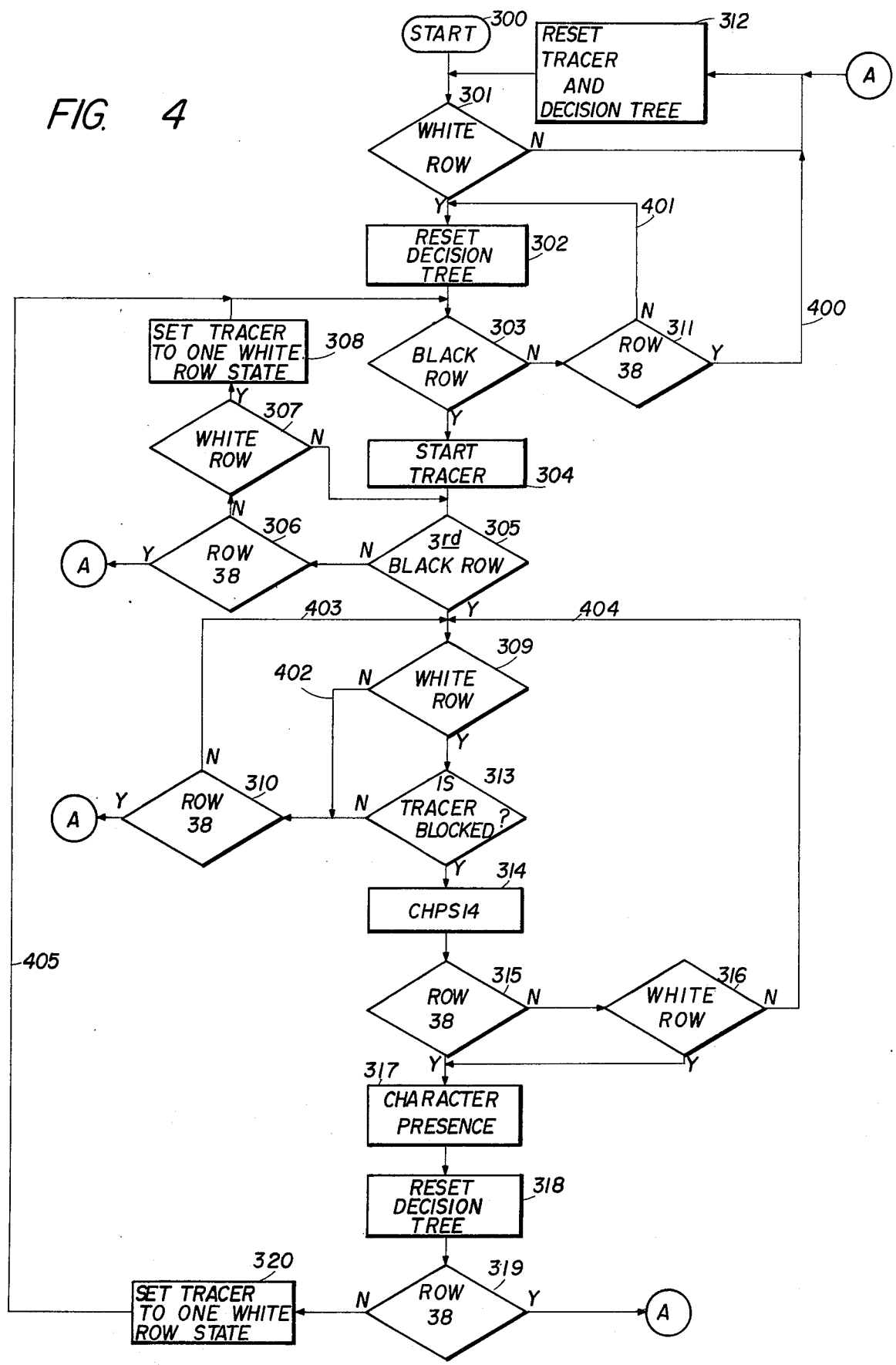
FIG. 4 is a functional flow diagram of a tracer circuit employed in the character presence processor of FIGS. 1 and 2.

As shown in FIG. 4, the tracer circuit is enabled when an all white row signal followed by a black row signal is received from decoder 102 on line 110. Until the white row signal is detected at state 301, the logic flow merely cycles at the row scan rate along path 400 through state 312, which resets the tracer network to its start state 300 and energizes ROM bit 1 to generate a signal, DTRES, along line 141 to reset the decision network of processor 53. When a white row signal is received, the logic flow proceeds to state 302 where again ROM bit 1 is energized for a duration equivalent to the time required to scan one row of array 50.

When the DTRES signal issues from ROM 104 on line 141 to controller 111 as shown in FIG. 2, controller 111 resets processor 53 by transmitting a signal, CHDECRES, along line 119 to buffer 113. Resetting buffer 113 returns the sequential decision network of ROM 108 to state 0000, as before described. Since controller 111 must clock ROM 108 decisions into register 115 before buffer 113 is reset, DTRES is applied to controller 111 rather than directly to buffer 113.

CHDECRES is also generated by controller 111 in response to two white row signals being generated by decoder 102 after the bottom row of a character has been scanned, after one white row signal is detected below a last character or symbol row if that white row is row 38 of array 50, and when less than three black row signals precede a white row signal. In addition, the signal is generated at the row scan rate until after the first white row is detected, and is generated when a space or white path between adjacent characters is in registration with the center three columns of array 50.

From logic state 302 of FIG. 4, the process continues to state 303 to test for a black row signal from decoder 102. If a black row signal has not been received, the process transfers to state 311, where a row 38 test is made. If the last row scanned was row 38 of array 50 as signified by a row 38 signal from a row counter 123 along line 180 to buffer 114, the process transfers to state 312 where the tracer network and the decision network of ROM 108 are reset and the search for a white row followed by a black row signal is again begun at state 301. If the last row scanned is not row 38, path 401 is followed to again set ROM bit 1 at state 302 and test for a black row signal from decoder 102 at state 303.

If a black row signal has been received, the tracer network is enabled at state 304 and the center three columns of video data received from preprocessor 51 are searched for a character or a white path passing through the center of array 50.

As the tracer process continues, a series of tests are made on a row by row basis beginning with state 305, where a test for the occurrence of three consecutive black rows is made to distinguish between extraneous black cell information and a legitimate character top. If less than three rows with black cell content have been detected, a transfer is made to state 306 to determine whether the last row in a frame, row 38, has been scanned. A row 38 signal from counter 123 causes the logic flow to continue through node A to state 312. A transfer to state 307 is made, however, when less than 38 rows have been scanned during a frame.

In the event a white row is preceded by less than three black rows, a transfer is made to state 303 and the tracer network of state 304 is set to a one white row detected condition.

If no white row is detected before three consecutive black rows are counted at state 305, each row of incoming video data is tested at state 309. Until an all white row occurs or the last row in a frame is scanned, the logic flow cycles at the row scan rate around a closed loop including states 309 and 310, and logic paths 402 and 403. If a row 38 signal is received by controller 111 before a white row is detected at state 309, a transfer is made through node A to state 312. However, in the event a white row is detected before the last row of array 50 is scanned, the tracer network is tested at state 313 for a blocked condition signifying the existence of a character or symbol in the field of information.

For example, consider a bit configuration of XXXX being received at the row scan rate by ROM 104 as shown in FIG. 2. The first bit represents an all white row signal from decoder 102, and the three trailing bits represent a three-bit data word corresponding to the center three columns of data received from preprocessor 51. The tracing process embodied in state 304 searches for a vertically directed white path through the center three columns of video data. The tracer makes only vertical or right angle transfers, with no diagonal shifts or transfers outside of the three columns.

As shown in Table V, sequence A presents a blocked path to the tracer while sequence B represents an open or white path.

TABLE V

| A | B |
|---|---|
| 0001 | 0001 |
| 0010 | 0011 |
| 0100 | 0001 |
| 1000 | 0100 |
| 1000 | 1000 |
| 1000 | 1000 |

Continuing with the flow diagram of FIG. 4, an unblocked condition at state 313 initiates a transfer to state 310 where a row 38 test is made as before. However, when a tracer-blocked condition is detected at state 313, ROM bit 0 is set at state 314 for a single row scan period to generate a CHPS14 signal on line 140 to controller 111. CHPS14 serves as a warning that a blocked path exists, one white row has been detected, and a character decision may be forthcoming.

The process continues at state 315 where a row 38 test is made before testing for a second all white row at state 316. If one white row has been detected and an end of frame or row 38 signal has not been received, then a test for a second white row at state 316 is made. However, if one white row has been detected at row 38, then ROM bit 2 is set at state 317 to generate a character presence signal, CHPRES, along line 120 to controller 111.

CHPRES signifies the blocking of the path of the center three columns of video data with black cells, and the presence of a character or symbol in the field of information being read.

In the event a second white row is detected prior to row 38 being scanned, a transfer is made from state 316 to state 317 to generate a character presence signal as before. If no white row is detected, the logic flow recycles along path 404 to state 309 to initiate a new search for two white rows.

Thus, when an end of character condition exists (one white row at row 38 or two white rows), a character presence signal is generated and the decision network of ROM 108 is reset at state 318. If row 38 has been scanned, a transfer from state 319 to node A is made. However, if rows of photosensor array 50 remain to be scanned between an end of character white row and row 38, then the tracer circuit is set to a one white row state at logic state 320 and the logic flows continues along path 405 to state 303.

When a character is recognized during the time processor 53 is enabled, a two bit character decision signal, CHARDEC, issues from ROM 108, as shown in FIG. 2, along line 128 to controller 111, which in turn inhibits the load signal, CDLD, to buffer 113 on line 138. Both a character presence signal from processor 55 and a character decision from processor 53 are required before information is transferred from ROM 108 to a decision register 115 along line 144 as shown in FIG. 2. Thus, even if a decision were reached by processor 53 during the period that it was enabled, no information is transferred to register 115 in the event that a character presence signal is not received by controller 111 by the time the bottom of the character in the field of view is scanned. Controller 111 in that case merely resets processors 53 and 55 by issuing CHDECRES and CPRES along lines 119 and 118, respectively. When the above conditions are met, controller 111 enables register 115 by transmitting a signal, DRLD, along line 145. The register is then loaded with the current output of ROM 108 upon receipt of the leading edge of the next clock pulse generated by CLK1 on line 146.

The executive controller of frame activity in the recognition unit is controller 111, which includes a black row counter, a white row counter, a white path counter, a row counter used in character height comparisons, a character presence counter, and a frame counter which is incremented by a row 38 signal received from counter 123 on line 142 at the end of each frame and is reset when a white path is encountered.

To enhance the reliability of the recognition unit, controller 111 performs a sequence of tests on the contents of register 115 before clocking the data into decision buffer 122. The contents of register 115, a character or symbol code, are led through line 147 to a character code decoder 124. The output from decoder 124 is applied through line 148 to controller 111, which compares the character or symbol against the contents of an internal character height row counter (not shown). The height counter is energized by the first black row signal following a white row signal from decoder 102 on line 109, and deenergized by the CHPRES signal received from ROM 104 on line 120 indicating the bottom of a character. The contents of the row counter are thus a measure of the height of the character represented by the output of decoder 124.

If three to five black rows are counted by the height counter, then a force period signal is generated on line 21 to force a period code into buffer 122. If six to nine black rows are counted, then the character data must represent quotation marks, a ">", or be rejected. With 10 to 19 black rows, the character data may represent any character or symbol except a quotation mark or a period.

Where a character height of 20 or more black rows is detected, all inputs between white paths are ignored and a signal is generated on line 174 to inhibit the output 134 of a decision resolving controller 131. Thus, any decision between the white paths are ignored.

Where decisions of different height ranges are encountered during a single frame, only the decision corresponding to the largest allowed height is transferred from buffer 122 to processor 54. Multiple decisions of the same height occuring in a single frame are rejected.

Controller 111 also rejects a character recognition by inhibiting the loading of buffer 122 when two consecutive undefined black row signals, feature code equal zero conditions, are received from decoder 106 on line 139 during a single frame.

When the controller 111 receives two white row signals from decoder 102 followed by a CHPRES signal on line 120 from ROM 104 flagging the scanning of a character bottom, the controller checks for a character decision signal on line 128 from ROM 108. If a character decision has been made, the controller tests the decision code against the possible reject criteria previously described. If no rejects occur, controller 111 issues a load command, DBLD, on lines 153, 154, and 157 to load buffers 122 and 126, and register 156, respectively. The buffers and the register are then loaded on the leading edge of the next pulse from their respective CLK1 inputs. Controller 111 next issues a store decision command on line 129 to controller 131 and a load command, BBLD, on line 158 to a bottom buffer 159 which loads the contents of register 156 on the leading edge of the next pulse on line 160 from CLK1.

If a character decision signal is not detected or if the character decision is rejected, then controller 111 issues reset signals CHDECRES and CPRES along lines 119 and 118 to clear buffers 113 and 114, respectively, and reset the decision network and tracer circuits.

In addition, controller 111 assists the edit device in prohibiting incorrect character decisions in a frame which result from character fragments being interleaved with spaces in a field of view where a character would normally appear. A tracking system is employed wherein outputs from array 50 are treated in terms of four vertical quadrants, each quadrant being twelve photosensors wide. In one embodiment, only the lower 32 rows are utilized with eight rows in each quadrant. If a character segment is read in quadrant 1, and nothing appears in quadrant 2, and a character segment follows in quadrant 3 during the same frame, then a decision will be made to read only quadrant 3.

More particularly, row counter 123 continuously counts the clock pulses from CLK1 on line 143 and transmits a pulse along line 151 to a quadrature decoder 125 each time a row is scanned. Decoder 125 in turn issues a signal along line 152 to a quadrature buffer 126 to identify the quadrant in which the given row is positioned. Upon receipt of a load signal, DBLD, from controller 111 by way of lines 153 and 154, buffer 126 loads the decoder 125 output on the next leading edge of a pulse from CLK1 on line 155. The quadrant information remains in buffer 126 until controller 131 directs a decision order RAM 132 to load the contents of buffer 126.

Upon receiving a decision complete signal on line 135 from controller 131, the edit device utilizes the quadrant information stored in an output register 175 to guard against incorrect character decisions which would result when a portion of one character in an upper information line is scanned at the same time a portion of a character in a lower line is scanned.

FIG. 5

Figure 5:
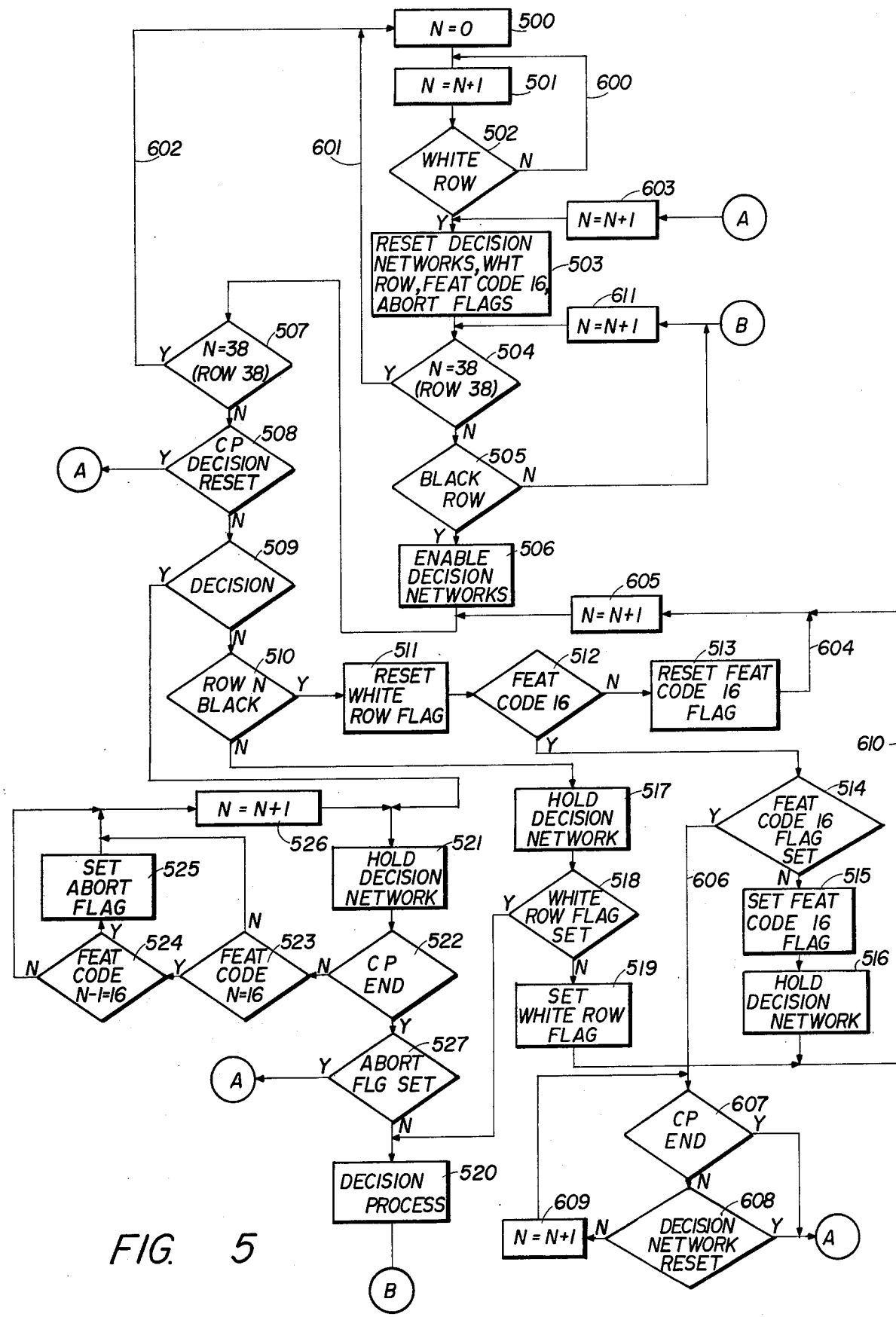
FIG. 5 is a functional flow diagram of the logic network within the decision input controller of FIG. 2.

Referring to FIG. 5, the control process of the decision input controller 111 is illustrated in a logic flow diagram beginning with the initialization of an internal row counter at state 500. The row counter is then incremented by one at logic state 501 and a test for a white row signal from decoder 102 is made at state 502. If a white row signal has not been received, then the logic flow recycles along path 600 and again increments the row counter by one. A test for a white row signal occuring at the next succeeding row of array 50 is then made at state 502. If a white row signal is detected, a transfer is made to state 503 where the character decision reset signal, CHDECRES, is issued along line 119, and the clear decision buffer signal, CLDB, is issued along lines 167 and 168. In addition, a white row flag, a feature code 16 flag, and an abort flag are reset.

The row counter is sampled at state 504 to determine whether an end of frame has occurred. In the event the counter contains a row 38 indication, the logic flow proceeds along path 601 to state 500 where the counter is again reset and the process begun anew. If the last row counted is not row 38, then the process continues along the main decision path to state 505 where a test for a black row signal is made. When a black row signal has been received from decoder 102 signifying that the current input video data contains black cell information, the character recognition processor 53 is enabled to state 506 by issuing a load signal, CDLD, on line 138 to buffer 113.

From state 506, the logic flow transfers to state 507 where the row counter is again tested for an end of frame or row 38 indication. If an end of frame is indicated, logic path 602 is followed to state 500 where the row counter is reinitialized. If an end of frame is not indicated, a transfer is made to state 508 to determine whether a decision network reset signal, DTRES, has been received from ROM 104 along line 141. If a decision network reset signal has been received, the logic flow proceeds to node A where the row counter is incremented by one at state 603, and the process is continued from state 503. If a decision network reset signal has not been received, then the logic flow continues from state 508 to state 509 where controller 111 tests for a character decision signal on line 128 from ROM 108. In the event a character decision signal has not been received, line 109 of FIG. 2 is sampled for a black row signal at state 510. If a black row signal is present, the white row flag is reset at state 511 and a test for a feature code 16 condition is made at state 512. A feature code 16 condition occurs when both a feature code equals zero signal generated by decoder 106 and a concurrent black row signal generated by decoder 102 received by controller 111. The condition thus signals the occurrence of unidentified black cell information in a row.

The absence of a feature code 16 condition at state 512 causes the feature code 16 flag to be reset at state 513. The logic flow then proceeds along path 604 to state 605 where the row counter is incremented by one, and the process is continued from state 507.

If a feature code 16 condition does exist at state 512, then a transfer to state 514 is made to determine whether the feature code 16 flag has been set. In the event the flag has been set, logic path 606 is followed to state 607 to test for an end of character presence condition denoting the scanning of a character bottom. The existence of an end of character presence condition causes a transfer to be made a node A where the row counter is incremented by one at state 603, and the control process continues from state 503. If an end of character presence condition does not exist at state 607, a test for a decision network reset condition is performed at state 608. If a reset condition does not exist, the row counter is incremented by one at state 609 and a transfer is made to state 607 to again test for an end of character presence condition. However, if a decision network reset condition exists at state 608, a transfer is made to node A where the row counter is incremented by one at state 603, and the control process again continues from state 503.

When a feature code 16 flag is not detected at state 514, the flag is set at state 515, and the decision network is placed in a hold state at state 516 by inhibiting the CDLD signal on line 138 leading to buffer 113. The logic flow then continues along path 610 to state 605 where the row counter is incremented by one.

Returning to state 510 under the condition that a character decision signal is not detected at logic state 509 and black cell information is not found in the video data under consideration at state 510, the decision network is placed in a hold state as before at state 517 by inhibiting the CDLD signal along line 138 leading to buffer 113. A test is then made at state 518 to determine whether a white row flag has been set. If not, the flag is set at state 519 and the control process continues along path 610 to state 605 as before described.

Where a white row flag has been previously set, the logic flow transfers from state 518 to state 520 to perform the sequence of rejection tests previously described on the contents of register 115 before clocking the data from the register into decision buffer 122.

From state 520, a transfer through node B to state 611 is made where the row counter is incremented by one. The control process then continues from state 504.

In the event a ROM 104 decision network reset signal, DTRES, is not detected on line 141 of FIG. 2, but a character decision signal, CHARDEC, is detected from ROM 108 on line 128, then the control process transfers from state 509 to state 521 where the decision network is placed in a hold state by inhibiting the signal CDLD on line 138 leading to buffer 113. A test is then made at state 522 to determine whether an end of character presence condition exists. If two white row signals signifying an end of character scan condition are not detected, a test for a feature code 16 condition is made at state 523. If a feature code 16 condition exists, a transfer is made to state 524 where a test is made to determine whether the previous video data processed also generated a feature code 16 condition. If so, then an abort flag is set at state 525, a transfer is made to state 526 to increment the row counter by one, and the control process resumes at state 521. If a feature code 16 condition was not generated by a previous row of video data, then a transfer is made directly from state 524 to state 526 where the row counter is incremented by one and the control process continues at state 521 as before.

From state 521, a transfer is made to state 522 to again test for an end of character presence condition. If the bottom of a character has been scanned, the process continues to state 527 where a test for the existence of an abort flag is made. In the event an abort flag has been set, a transfer is made from state 527 through node A to state 603 from which the control process continues. If an abort flag has not been set, then a transfer is made from state 527 to state 520 where a sequence of tests are made on the contents of register 115 as before described.

Upon receiving a store decision command from controller 111 as shown in FIG. 2, controller 131 directs the storing of both the six bit character code of buffer 122 and the contents of buffer 126 into a 32 by 8 bit RAM 132. Thus, a single word in RAM 132 contains a six bit character code and two bits of quadrant information.

Under the direction of commands from controller 131 on lines 162, 171, and 165, character information is transferred from RAM 132 along line 163, through controller 131 and along line 165 leading to a 64 by 8 bit character code addressable RAM 133. As additional character information generated by the scanning of a single character is transferred from buffer 122 to RAM 132, controller 131 compares the incoming code with the contents of RAM 132. If that character code has already been stored, the contents of a memory cell corresponding to that character code is loaded from RAM 133 into counter 170, incremented by one, and again stored in RAM 133.

As the row scan rate is high compared to the relative movement between the array 50 and the field of information to be read, a single character may be scanned many times. Thus, a string of character codes is generated by processor 53 to reflect the movement of a single character across array 50.

The end of such a character string is defined by the lack of a character presence at the end of the string followed by the occurrence of three white paths. Upon detection of an end of frame signal without an accompanying character presence signal, controller 111 samples a character presence counter (not shown) to determine whether character presence signals were received during six consecutive frames. If six consecutive signals were received, controller 111 samples a white path counter (not shown) to determine whether three white paths have been identified. If so, controller 111 issues a start resolving command on line 130 to controller 131.

FIG. 6

Figure 6:
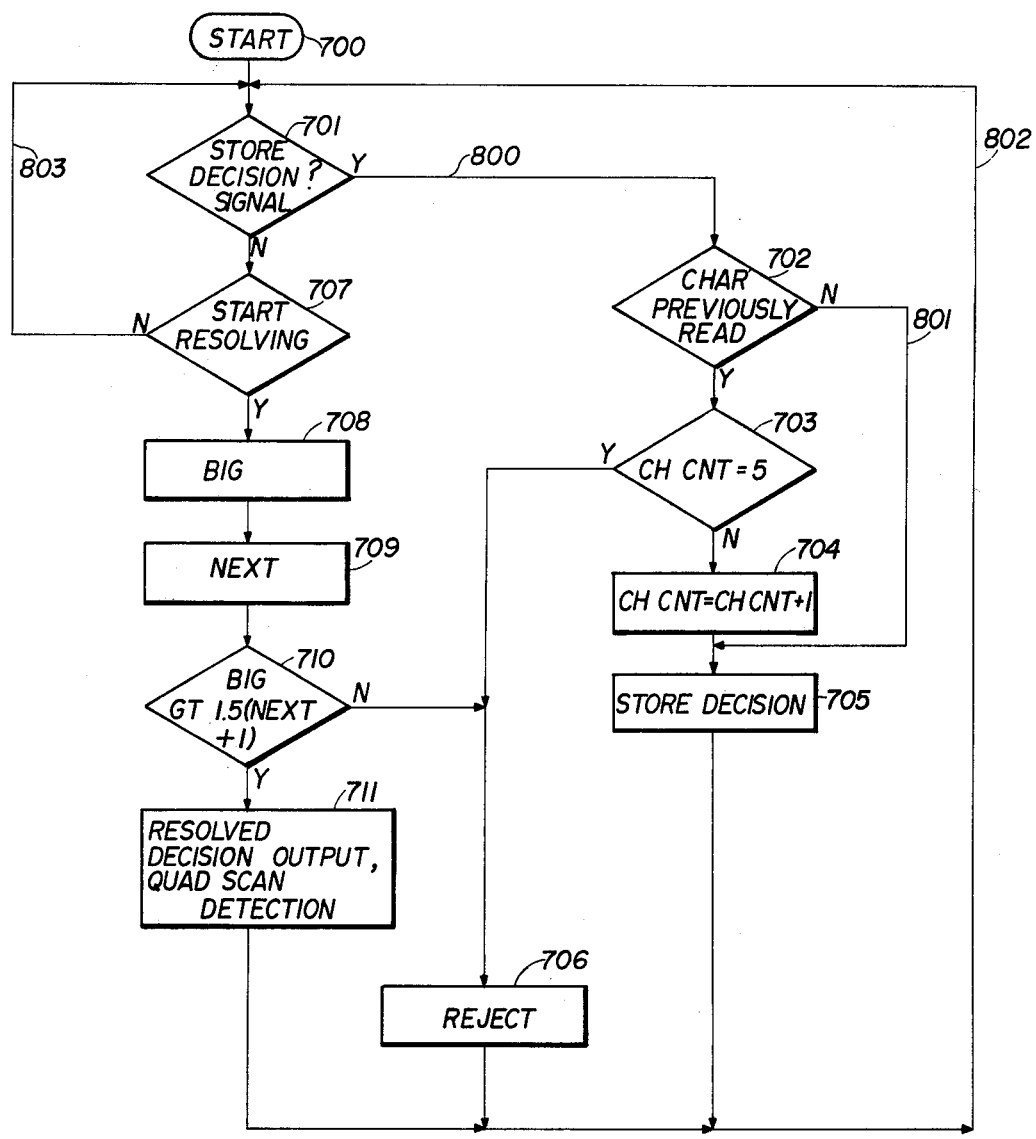
FIG. 6 is a functional flow diagram of the logic network within the decision resolving controller of FIG. 2.

The internal decision process of the decision resolving controller 131, as illustrated in FIG. 6, is initiated at logic state 700. A test for a store decision signal on line 129 from controller 111 then follows at state 701.

If a store decision signal has been received, a transfer is made along path 800 to logic state 702 where the contents of RAM 132 are examined to determine whether or not the character code stored in buffer 122 has been previously read by controller 131. If not, the process continues along logic path 801 to state 705 where the contents of decision buffer 122 and quadrature buffer 126, as shown in FIG. 2, are loaded into decision order RAM 132.

In the event the character code stored in buffer 122 has been previously read, then a test is made at state 703 to determine whether more than four different character decisions have been generated from a single character image passing across array 50.

If five or more different character decisions have been generated, then a reject signal is generated at state 706. If less than five different character decisions have been generated, then the process continues from state 703 to state 704 where a character counter is incremented by one and a transfer is made to state 705. The contents of decision buffer 122 and quadrature buffer 126, illustrated in FIG. 2, then are stored in the decision order RAM 132, and the logic flow recycles along path 802 to again test for a store decision signal at state 701.

When a store decision signal is not present on line 129 of FIG. 2, a transfer is made to state 707 to test for the presence of a start resolving signal on line 130 from controller 111. If a start resolving signal is not present, the logic flow recycles along path 803 to again test for the presence of a store decision signal at state 701.

In the event a start resolving signal is present at state 707, the contents of RAM 133 are examined at state 708 to determine the largest character count, BIG. At state 709, RAM 133 is again examined to determine the next largest character count, NEXT.

BIG then is compared with NEXT at state 710 to determine whether BIG is greater than NEXT + 1 multiplied by 1.5. If not, a reject signal is generated at state 706 and applied through output line 134 to an output register 175, and a decision complete signal is transmitted on output line 135 to an edit device. The logic flow then recycles along path 802 as before.

If BIG is greater than NEXT + 1 multiplied by 1.5, the character corresponding to BIG is the decision resolved at state 711, where the character decision with quadrature information is output on line 134 to register 175. Also, a decision complete signal and a scan direction logic output from unit 56 are transmitted by controller 131 along lines 135 and 176, respectively, to an edit device (not shown). From state 711, the program continues along path 802 to recycle as before described.

Thus, when a start resolving signal from controller 111 is received, controller 131 begins a series of tests to resolve a final character decision. If all of the frame scans for a particular character result in rejects, then a reject code is generated by controller 131. If codes other than rejects are present, each different code is counted to find the number of times each occurs, such information being stored in RAM 133. Reject codes are not counted when counting characters.

If one character occurs more than 1.5 times plus 1.5 more than any other character, then that is the character identified. If no character code occurs 1.5 times plus 1.5 more than the other character codes, then the character code output is a reject code.

Other reject conditions occur when no character decisions are made and an empty storage is detected between white paths, or when more than four different decisions other than rejects and periods are stored between white paths. As previously described, period decisions are rejected if other decisions of a larger height range are made between white paths.

When a character decision is made, a character identification signal including quadrature information is output on line 134 along with a decision complete flag on line 135. The outputs are to an edit device which presents the data as legible words, phrases or sentences.

To aid the edit device, a scan direction logic unit 56 receives 6 bits of data, representing the six left-most columns of video data from preprocessor 51, and generates a scan direction signal on line 172 which is output to the edit device by controller 131.

FIG. 7

Figure 7:
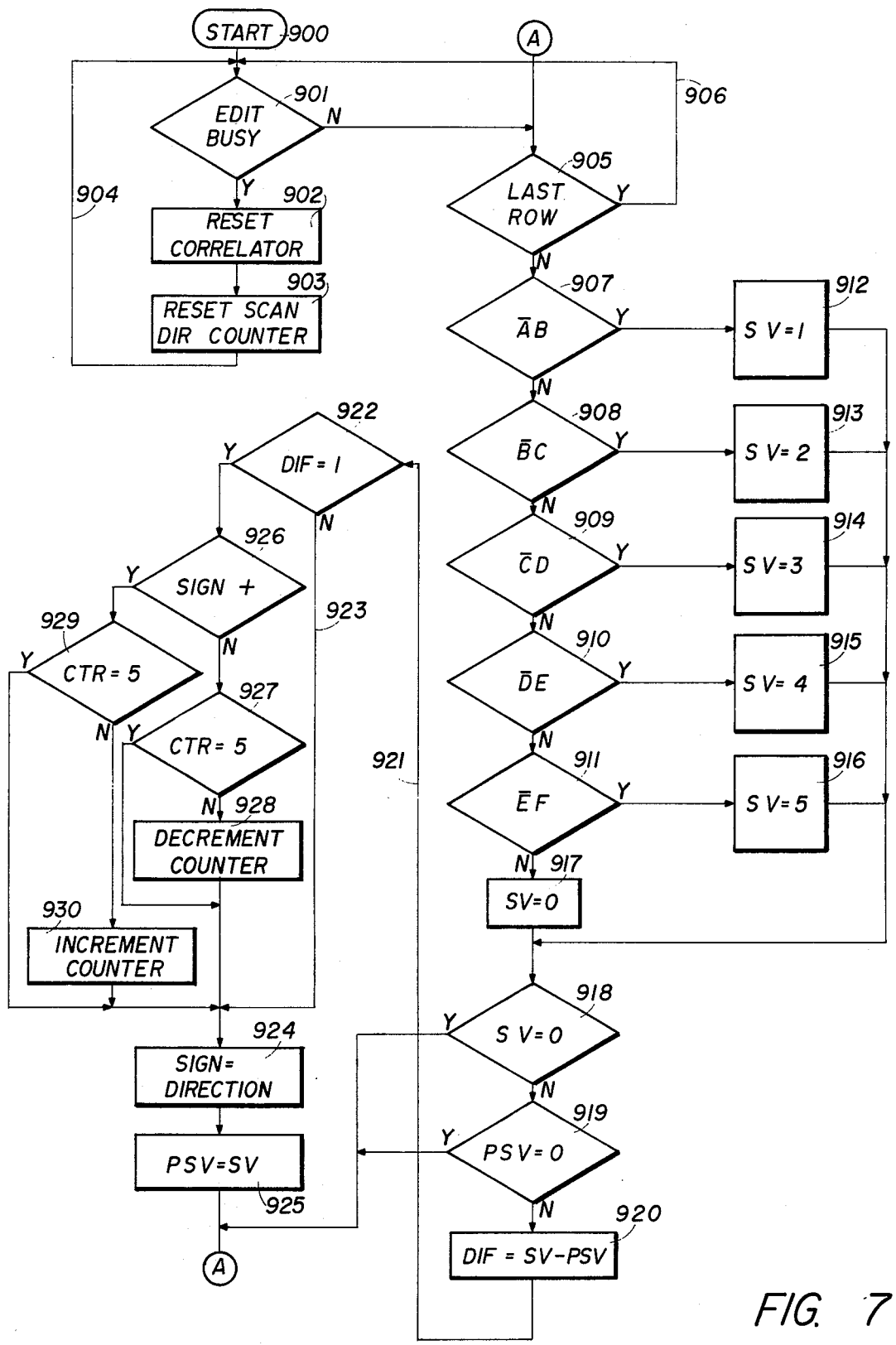
FIG. 7 is a functional flow diagram of the scan direction logic circuit of FIG. 2.

As shown in FIG. 7, where the internal process of the scan direction logic unit 56 is illustrated, the decision process passes from a beginning or start state 900 to state 901 to test for the presence of a busy signal from an edit device on line 178, FIG. 2. When a busy signal is present, preprocessor 51 is reset at state 902 and a scan direction counter internal to unit 56 is reset at state 903. The process then recycles along logic path 904 to again test for the presence of a busy signal at state 901.

If a busy signal is not present, then a transfer is made from state 901 to state 905 to test for the occurrence of a row 38 signal from row counter 123 along path 177, FIG. 2. If a row 38 signal has been generated by counter 123, then the process recycles along logic path 906 to state 901. If a row 38 signal has not been issued by counter 123, the process enters into a white to black transition detection stage beginning with state 907.

The six bits of video data supplied to unit 56 by preprocessor 51 at the row scan rate are the six left-most bits of the correlator video output. Each of these bits are represented in the flow diagram of FIG. 7 by letters A through F, with A representing the left-most bit. At each of the test states 907 through 911, a search is made for a white to black cell transition between the columns of video data as represented by the six bits. As designated in states 912 through 916, the first transition detected causes a scan value register to be loaded with a number corresponding to the column having the black cell content. Each of the columns of video data are designated by the numbers 0 through 5.

If a white to black cell transition is not detected, then the scan value register is loaded with the number 0 as illustrated at logic state 917.

After the scan value register has been loaded with a number 1 through 5 indicating the occurrence of a white to black transition, or the number 0 indicating that no white to black transition was detected, a transfer is made to state 918 to examine the contents of the scan value register.

If the scan value register contains the number 0, then a transfer is made to node A to again test for the occurrence of a row 38 signal at state 905. However, if the contents of the scan value register are other than 0, then a transfer is made to state 919 to examine the contents of a previous scan value register. If the previous scan value is 0, then a transfer is made to node A as before. In the event the previous scan value is other than 0, however, the contents of the previous scan value register are subtracted from the contents of the scan value register. The difference is stored in a difference register as shown at logic state 920.

The logic flow then proceeds along path 921 to state 922 where the absolute value of the difference register contents are examined. If the absolute value is not equal to 1, then a direct transfer is made along logic path 923 to state 924 where the most significant bit in the scan direction counter is examined for a direction indication. The bit value, whether a 0 or a 1, is then stored in a direction register for output through the resolving controller 131 to an edit device.

The scan direction counter is a four bit counter with the most significant bit utilized as a sign bit. The contents of the counter are processed with the number 4 signifying a −5 scan count, the number 9 signifying a 0 scan count, and the number 14 signifying a +5 scan count. Thus, a scan direction threshold of ±5 is indicated by storing numbers between 14 and 4 in the counter. The number 9 represents the origin between the threshold extremes. A number greater than 9 and less than or equal to 14 indicates a scan in one direction, while a number less than 9 but greater than or equal to 4 indicates a scan in the opposite direction.

After the sign bit of the scan direction counter is stored in the direction register at state 924, the current scan value is loaded into the previous scan value register as illustrated at state 925. A transfer then is made to node A to again test for the occurrence of a row 38 signal at state 905.

If the absolute value of the difference register contents are equal to 1, a transfer is made from state 922 to state 926 to examine the sign of the difference register contents. If the sign is negative, then the contents of the scan direction counter are examined at logic state 927. In the event the counter contains the number 5, a transfer is made directly to state 924. However, if a numnber less than 5 is stored within the scan direction counter, the counter is decremented by one at logic state 928 before a transfer to state 924 is made.

Where the sign of the difference contents is positive, a transfer is made from state 926 to state 929 where again the contents of the scan direction counter are examined. If the counter contains the number 5, a direct transfer is made to state 924 as before. However, if the counter contains a number less than 5, the scan direction counter is incremented by one at state 930 before a transfer is made to state 924.

As an additional aid to the edit operation, controller 111 acts in combination with controller 131 to flag an end of word or end of sentence condition where a space should occur between sequences of characters.

More particularly, row counter 123 of FIG. 2 is a recycling counter which continually counts at the row scan rate during a frame to provide a pulse every 38 counts on line 142 to flag an end of frame condition to controller 111, and to update both decoder 125 and a bottom register 156 at the row scan rate. As register 156 is loaded only after an end of character scan, the register contains the number of rows from the top of array 50 to the bottom of the character being scanned.

When a load command, BBLD, is issued by controller 111 along line 158 to a bottom buffer 159, the contents of register 156, which are used only when a search for a character space is made, are led along line 161 through a bottom of character decoder 150, the thence along line 149 to an internal bottom buffer within controller 111. During the processing of character information, controller 111 continually overlays bottom buffer information so that at any given time the internal bottom buffer contains only information pertaining to the last character code transmitted to decision buffer 122.

When the end of a sequence of characters occurs, as noted by the occurrence of an end of frame signal without a character presence signal, controller 111 samples a character presence counter to determine whether a character presence signal was received in six consecutive scan frames. If so, controller 111 then samples a white path counter (not shown) to determine whether three consecutive white paths have been detected. If the three white paths have been received, controller 111 processes the bottom of character information corresponding to the last character stored in RAM 132. This information serves as the reference position from which a character space is detected.

Controller 111 compares the bottom data against force-space criteria. For example, when the bottom of the last character is below the top 20 rows of array 50, the detection of 20 consecutive white rows above the bottom row of the last character results in the generation of a force-space signal on line 173 leading from controller 111 to buffer 122. There may be some black segment features above the bottom line of the last character separated from the character itself. However, where 20 white rows occur between such features and the bottom row of the last character stored in RAM 132, a force-space signal will be generated. Where the bottom of the last character is within the top 20 rows scanned, then only the first or top 20 rows are processed. If the top 20 rows are all white, then a force-space signal is generated.

If either of the above two criteria are not met after three consecutive white paths have been detected, then controller 111 issues an output signal on line 174 which inhibits the output of controller 131 to the edit device. Controller 131, however, continues to function as only its output is inhibited.

The distinction between a white path and a forced space is thus apparent. The forced space stored in buffer 122 is a character code which is output by controller 131 as a character decision to the edit device. A forced space thus constitutes a character decision involving 10 white columns, while a white path merely involves three vertical columns of video data occurring between adjacent characters in the information field.

In accordance with the invention there is provided a recognition system in which a continuous flow of video data generated by a photosensor array is applied at the scan rate without intermediate storage to a character recognition network.

Feature codes generated from the video data at the scan rate are applied to a sequential decision network of nonordered logical nodes or states for character recognition. The logical states are interconnected by means of logical paths or links, with each state separated from every other state by one state transfer. The decision flow through the network may thus cross logical paths or revert to previous states to increase network versatility and minimize redundancies.

Operating concurrently with the sequential decision network to enhance recognition reliability are logic circuits which distinguish between character or symbols, fragments, and spaces in the field of information.

As a given character image moving across a photosensor array will be repeatedly scanned, a final character decision is made after the image has passed from the field of view on the basis of the character identification generated the greatest number of times. Scan direction and vertical positioning data are output concurrently with the final character decision as an edit aid.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an automatic optical pattern recognition system, the method which comprises scanning a two-dimensional array of photosensors in a raster-like ordered sequence at a scan rate high compared to relative movement between a field of information and said array, processing binary video data flowing from said array at said scan rate without intermediate storage to produce representative feature codes for each scan, applying said feature codes from a complete scan of said array to a distributed flow sequential network, processing said feature codes by a one step state transfer to any logical node in said network to generate a character code representative of a unique relationship between said sequence of feature codes, and identifying a pattern from a stream of character codes produced from repetitive scanning of said array while said pattern is in registration with said array.

2. In automatic pattern identification, the combination comprising:
  (a) a re-entrant and recursive sequential decision network with interconnected logical nodes, each node having access to other nodes by a one step state transfer from which decisions are to be signalled;
  (b) means to repeatedly scan a pattern field with each scan traversing a series of spaced paths at a rate high compared to the changes of a pattern in said field;
  (c) means to generate a different feature condition for each of a plurality of different character features encountered in scanning each said path;
  (d) means to apply said condition sequentially to said network;
  (e) means to count the number of times said network produces a character decision from a unique sequence of feature conditions during presence of said character in said field; and
  (f) decision means to indicate any character decision the incidence of which is greater than the incidence of any other character decision while said character is in said field.

3. The combination set forth in claim 2 which each node in said network is accessible by control structure which effects a single state change.

4. An automatic pattern recognition system, which comprises:
  (a) a two-dimensional array of photosensors:
  (b) means for raster-like scanning of said array in an ordered sequence at a scan rate high compared to the relative movement of a field of information across said array to produce a multi-bit binary word representing the black-white sequence in each traverse across said array;
  (c) means for generating a feature code at said rate representative of each binary word produced by said array;
  (d) means for generating a character code representative of a stream of feature codes produced during one complete scan of said array;
  (e) means for processing at said rate binary signals produced by center columns of sensors in said array to generate signals indicating the presence of patterns or void zones;
  (f) recognition controlling means including:
    (i) means for applying to said character code a plurality of tests tailored to a print font,
    (ii) means for inhibiting the output of said means for generating a character code when said means for processing indicates a void zone between patterns, and (iii) means for resetting said system when said character code does not comply with said plurality of tests; and (g) a second controlling means for identifying a character from a stream of character codes accepted at a frame scan rate corresponding to a complete scan of said array and generated in response to a pattern passing through a field of view of said array.

5. The combination set forth in claim 4 wherein said means for generating a feature code includes a ROM having a binary word input, and having each possible relationship of line segments in a print font stored as states within said ROM.

6. The combination set forth in Claim 4 wherein said means for generating a character code includes a ROM electrically connected in a closed loop to an output digital register, with said ROM addressable by a binary word comprising said feature code and a state number stored in said register identifying a last logical state of said ROM previously addressed, and wherein said ROM comprises a network of nonordered logical states interconnected by logical paths, with each logical state accessible to every other logical state by one state transfer, and with a plurality of logical paths leading to character code decision states from logical states positioned at the end of a decision path dictated by a pattern in registration with said array.

7. The combination of claim 4 wherein said means for processing includes a ROM comprising a plurality of ordered logical states forming a tracer network, a decoder in electrical communication with said array and said ROM, and a digital register electrically connected in a closed loop to said ROM, with said ROM addressable at said scan rate by a binary word comprising a binary signal from said decoder indicating pattern or void zone information, binary signals generated by center columns of photosensors of said array, and a last state output as represented by said register contents.

8. The combination set forth in claim 4 wherein said second controlling means includes two RAMs interconnected by a logical circuit, and an increment-by-one digital counter electrically connected to one of said two RAMs, with a first of said two RAMs accepting said stream of character codes, and a second of said two RAMs indirectly addressable by each said character code.

9. In an automatic pattern recognition system having a two-dimensional array of photosensors, the combination which comprises:

(a) means for scanning said array at a scan rate high compared to the relative movement of a field of information across said array;

(b) feature code generating means for producing at said scan rate from binary video data output of said array a code characterizing unique relationships between pattern segments;

(c) character code generating means employing sequential decision processing for signalling the occurrence of a pattern identification, and for identifying a pattern from a stream of feature codes produced by said feature code generating means during a complete scan of said array;

(d) pattern detection means operating at said scan rate for processing said array video data to signal the presence of a pattern or a void zone between patterns, and for signalling the end of a pattern scan;

(e) character decision resolving means for generating a final pattern identification signal, based on a most frequently occurring character code produced by said character code generating means while said pattern is in registration with said array;

(f) character identification controlling means including:

(i) means for applying height criteria tailored to a print font to a character code and rejecting said code in the event said character code does not correspond to height criteria, (ii) means for selecting a character code corresponding to a largest height encountered during a complete scan of said array, (iii) means for rejecting multiple character codes corresponding to a single height occurring during one complete scan of said array, (iv) means for rejecting character codes generated during one complete scan of said array without a concurrent signal from said pattern detection means indicating pattern presence, and (v) means for inhibiting output of said character code generating means to said character decision resolving means when a rejection occurs;

(g) means in communication with said character identification controlling means for tracking a vertical position of a pattern to aid an editor device and prohibit pattern fragmentations;

(h) character space detection means for inhibiting the output of said character code generating means when a void zone between a sequence of patterns is detected, and for supplying a character space code to said character decision resolving means; and (i) scan direction means in electrical communication with said array and said character decision resolving means for tracking an array scan direction.

10. In an automatic pattern recognition system, wherein a two-dimensional array of photosensors is scanned in an ordered sequence to form binary words at a row scan rate having black segment and void zone representations of a pattern within the field of view of said array, the combination comprising:

character presence means responsive to the binary words to determine the presence of a character in the field of view and generating a processor enable signal and a character presence signal, feature code generating means for producing a feature code from a preestablished list of feature code at said row scan rate characterizing predetermined relationships between black segment representations along each row, recognition means sequentially receiving said feature codes at said row scan rate, said recognition means including a distributed flow sequential decision network with interconnected logical nodes, each node having access to other nodes by a one step state transfer, said recognition means responsive to the processor enable signal and the character presence signal to produce from the decision network a pattern signal code from a unique sequence of said feature codes during each scan of said array, and decision resolving means receiving multiple pattern signal codes from said recognition means and generating a recognition signal when a predetermined number of pattern signal codes are generated by said recognition means during registration of a single pattern within the scanned array.

11. The combination set forth in claim 10 wherein said feature code generating means is a ROM having feature codes stored as states within said ROM.

12. The combination set forth in claim 10 wherein said recognition means includes a means having a decoder connected to receive said binary words, a digital register, and a ROM in communication with said decoder and said register.

* * * * *